May 17, 1955 M. C. DACK 2,708,364
DEVICE FOR TESTING THE TENSION OF COMMUTATOR BRUSH SPRINGS
Filed May 29, 1953 2 Sheets-Sheet 1
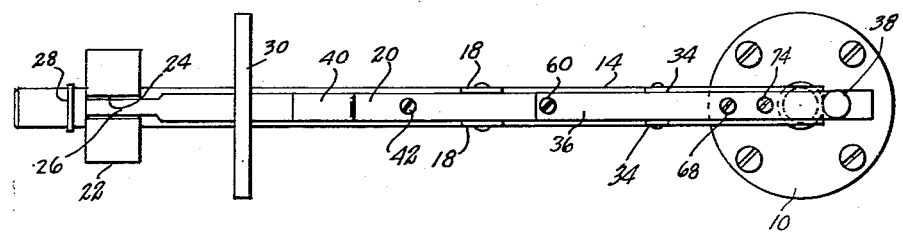
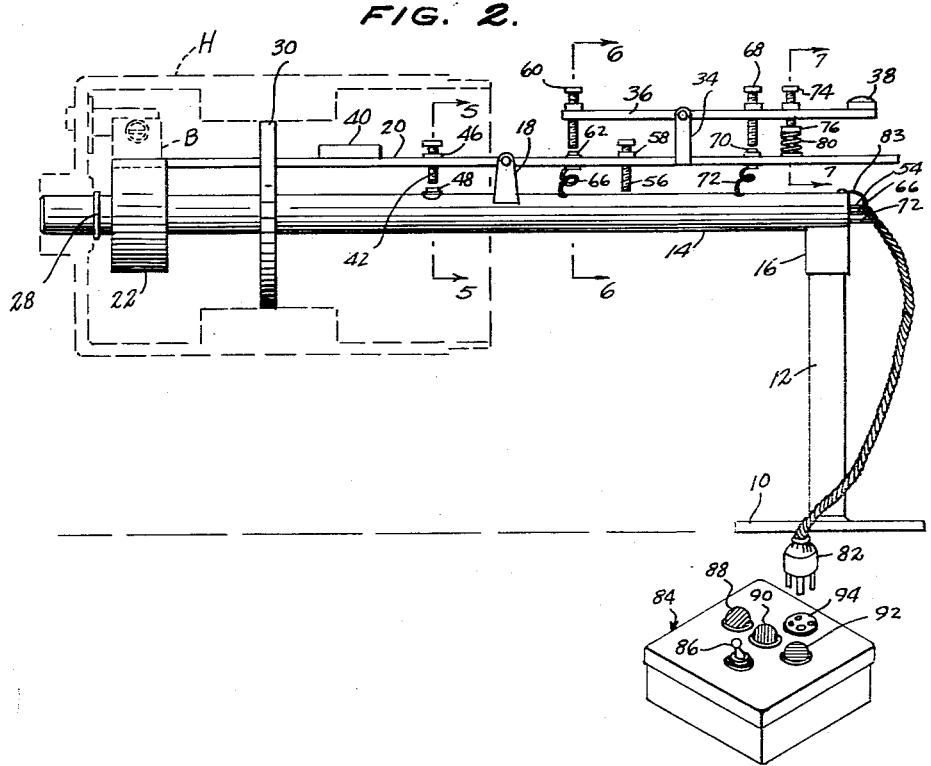
INVENTOR.
MARVIN C. DACK,
BY
McMorrow, Berman + Davidson
ATTORNEYS May 17, 1955   M. C. DACK   2,708,364
DEVICE FOR TESTING THE TENSION OF COMMUTATOR BRUSH SPRINGS
Filed May 29, 1953   2 Sheets-Sheet 2
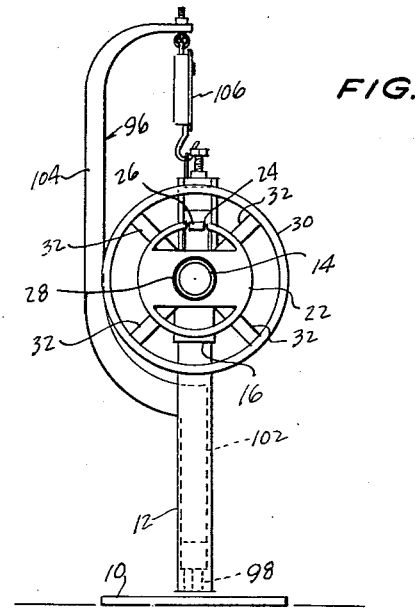
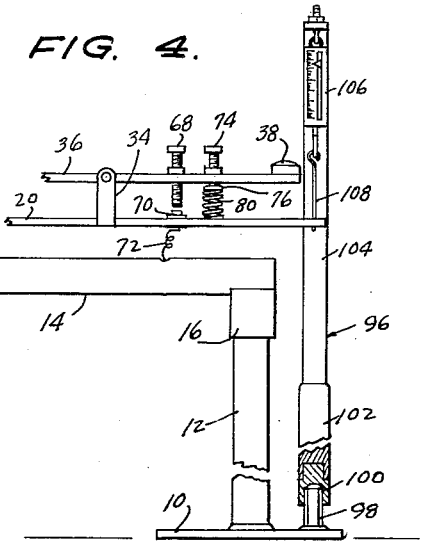
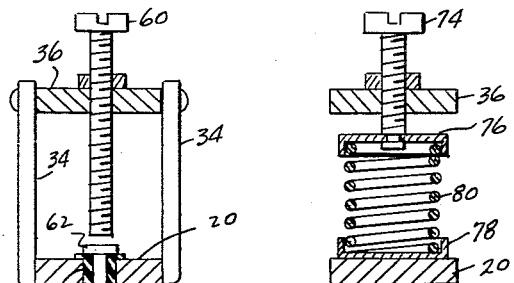
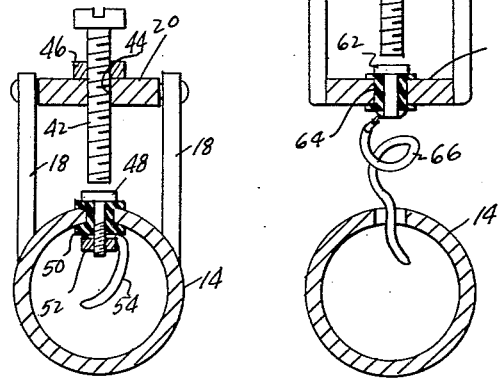
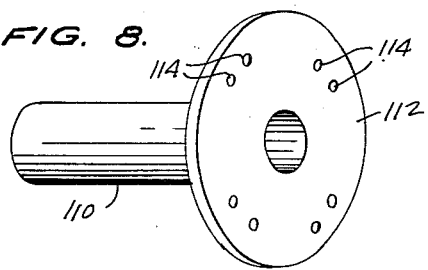
INVENTOR.
MARVIN C. DACK,
BY
McMorrow, Berman + Davidson
ATTORNEYS

United States Patent Office 2,708,364
Patented May 17, 1955

2,708,364

DEVICE FOR TESTING THE TENSION OF COMMUTATOR BRUSH SPRINGS

Marvin C. Dack, San Antonio, Tex.

Application May 29, 1953, Serial No. 358,389

3 Claims. (Cl. 73—161)

This invention relates to apparatus for determining whether the tension of a commutator brush spring falls within a predetermined range.

The main object of the invention is to provide apparatus as described where the spring will be tested while in operative relationship to its associated holder and brush, with the tension of the spring being made immediately apparent to the worker, through the medium of a plurality of electrically actuated signal devices, so arranged as to reflect a proper spring tension falling within a predetermined range, an excess amount of tension, or an inadequate tension.

Other objects will appear from the following description, the claims appended thereto, and from the annexed drawings, in which like reference characters designate like parts throughout the several views, and wherein:

Figure 1 is a top plan view;

Figure 2 is a view partly in side elevation and partly in perspective, a generator or starter housing being illustrated in dotted lines;

Figure 3 is an end elevational view taken from the left in Figure 2, and showing a scale accessory usable with the apparatus;

Figure 4 is a view similar to Figure 2 in which one end of the apparatus has been broken away, the scale accessory being viewed from the left of Figure 3;

Figure 5 is an enlarged sectional view on line 5—5 of Figure 2;

Figure 6 is an enlarged sectional view on line 6—6 of Figure 2;

Figure 7 is an enlarged sectional view on line 7—7 of Figure 2; and

Figure 8 is a perspective view of an adapter usable on the apparatus.

The reference numeral 10 has been applied to a flat, circular base capable of being bolted to a stationary bench surface or the like. Rigid with the base is a tubular, vertical standard 12, and carried by said standard is an elongated, tubular, horizontally extending support 14 one end of which has a short, depending sleeve 16 receiving the upper end of standard 12.

Intermediate its ends, support 14 is provided with transversely aligned, upwardly extending pivot brackets 18 which together define a main fulcrum. An elongated main lever 20 is pivoted intermediate its ends upon brackets 18.

A brush support sleeve 22 is circumposed about the free end portion of support 14, and is fixedly connected to said support. Sleeve 22 corresponds in respect to diameter to the diameter of a conventional commutator of a generator or starting motor, and when a conventional motor housing H is positioned over the free end portion of support 14 in the manner shown in Figure 2, the sleeve 22 will be located in the same position, relative to said housing, as would a commutator.

That portion of sleeve 22 overlying support 14 is split as at 24, and extending into the space provided by splitting the sleeve is the reducer tongue 26 formed upon the adjacent end of lever 20.

At 28, I have designated a stop collar, disposed between sleeve 22 and the adjacent free end of support 14. That portion of the support between said collar and the adjacent end of the support has the same diameter as that of the inner surface of the bearing cone or bushing of housing H at the commutator end of said housing, thus to permit the housing to be fitted on to the support during the test. The collar limits movement of the housing beyond a position in which the brush assembly B of the housing is registered with sleeve 22, thus to cause the brush spring to exert pressure, through the brush engaged thereby, against the tongue or segment 26.

In locating the brush relative to said tongue or segment, one would first position the housing H upon the apparatus in the manner described above. Thereafter, the housing is rotated until the brush is aligned with the segment. During the rotatable movement of the housing, the brush slides over the surface of sleeve 22, in the same manner as it would were the sleeve an actual commutator.

Proper positioning of the housing H in concentric relation to the support 14 is facilitated by use of a support ring 30 having a diameter substantially equal to that of the armature core that is to be subsequently inserted in the housing after the test is made. Due to the particular diameter of said ring 30, the ring will be engaged with the field cores of the housing.

Fixedly connecting the ring 30 to the support 14, in concentric relation with the support, are radial arms 32 (Figure 3).

On that end portion of main lever 20 remote from sleeve 22, I mount secondary, upstanding, transversely aligned pivot brackets 34, said bracket 34 providing a secondary fulcrum on which is pivoted an auxiliary lever 36. Lever 36, at one end, has a button 38, which can be manually depressed by the worker.

It is desirable that the main lever 20 be ordinarily so balanced upon its fulcrum as to dispose the tongue 26 thereof flush with the outer surface of the sleeve 22, and to this end, a counterweight 40 is positioned upon the main lever, between the pivot point of the main lever and the sleeve 22.

Referring now to Figure 5, I provide a contact screw 42 which is threaded in an opening 44 of main lever 20, between the main fulcrum means 18 and sleeve 22. Screw 42 is held in selected positions to which it is threaded by means of a holding nut 46.

The screw 42 is adjustably positioned to limit clockwise movement of main lever 20 about its fulcrum, that is, downward movement of that end of the main lever engaged by the brush assembly B.

Screw 42 also serves as a contact element, the screw engaging, when shifted downwardly with the main lever, a contact 48 extending downwardly through an insulating sleeve 50 mounted in an opening of support 14, and threaded at its lower end to receive a nut 52. Nut 52 holds a lead 54 in engagement with the contact 48, said lead 54 extending within the support 14 and out of that end of support 14 remote from the sleeve 22 (see Figure 2.)

Clockwise movement of lever 20 about its pivot is limited by a screw 56, threadedly engaged in an opening formed in the main lever on the side of the fulcrum opposite that at which the screw 42 is disposed. Screw 56 is held in selected positions of adjustment by means of a nut 58.

Threadedly engaged in that end of the auxiliary lever 36 remote from the end provided with button 38 is a contact screw 60, limiting counterclockwise movement of auxiliary lever 36 about its pivot axis. Screw 60 is engageable against a contact 62, to which is connected a second lead. Referring to Figure 6, it is seen that contact 62 is mounted on main lever 20, extending through an insulating sleeve 64 that is mounted in a sleeve-receiving opening of the main lever. The lead connected to the contact 62 has been designated by the reference numeral 66, and extends through an opening formed in support 14, so as to be disposed longitudinally of and within the support.

A third contact screw 68 is threadedly engaged in that end portion of the auxiliary lever 36 on which button 38 is mounted. Screw 68, when adjustably threaded to a selected position, is held in said position by a suitable lock nut. Screw 68 limits clockwise movement of the auxiliary lever 36 about its pivot axis, and is engageable against a contact 70 mounted in the main lever 20 and connected to a lead 72.

A tension-adjusting screw 74 is threadedly engaged in the auxiliary lever, adjacent screw 68, and as shown in Figure 7, is swivelly connected at its lower end to an upper retaining cup 76. Cup 76 is faced downwardly, opposing an upwardly facing lower retaining cup 78, a coil spring 80 being held under compression between the cups. Spring 80 normally exerts pressure against the auxiliary lever tending to swing the auxiliary lever counterclockwise about its pivot, the spring 80 thus tending to normally engage contact screw 60 against contact 62, while disengaging screw 68 from contact 70.

The several leads 54, 66, 72 are twisted into a single cord, having at its free end an electrical plug 82. Plug 82 has four prongs, three of said prongs being connected to the leads 54, 66, 72 respectively and the fourth prong being connected to a ground lead 83. Ground lead 83 is connected, at that end thereof remote from its associated prong, to the support 14 (Figure 2).

A panel assembly has been designated generally at 84, and is formed as a hollow casing in which flashlight batteries or some other suitable source of electric power, not shown, are mounted. In the removable cover of said casing I mount a main switch 86, which will be in circuit with the lead extending from the ground terminal of the panel assembly to the batteries, thereby to control the flow of current through the leads 54, 66, 72.

Also mounted in the cover of the panel assembly 84 are lamp bulbs 88, 90, 92, that constitute visual signal devices. Bulb 88 is adapted to be brought under circuit with lead 72. Bulb 90 will be in circuit with lead 54, and bulb 92 will be in circuit with lead 66.

A receptacle or socket 94 is also provided in the panel assembly, said receptacle having four openings for receiving the several prongs of the plug 82. It will be understood that each opening has an electrical connection therein, whereby the prongs are brought into circuit with their associated lamp bulbs or power source, as the case may be.

A receptacle or socket 94 is also provided in the panel assembly, said receptacle having four openings for receiving the several prongs ow the plug 82. It will be understood that each opening has an electrical connection therein, whereby the prongs are brought into circuit with their associated lamp bulbs or power source, as the case may be.

In use of the device, the housing H is positioned upon support 14 as shown in Figure 2. This causes the brush spring, constituting a part of brush assembly B, to exert downward pressure against the tongue 26 of main lever 20. This rocks main lever 20 counterclockwise about main fulcrum 18, causing screw 46 to contact the element 48.

At the same time, the spring 80 will have caused contact 60 to engage the contact element 62, thus causing the bulb 92 to be also illuminated.

The worker now presses downwardly on button 38, and if the tension of the brush spring falls within prescribed, suitable limits, the bulbs 90 and 92 should go dark simultaneously, or bulb 92 should go dark before bulb 90, with both bulbs 90, 92 going dark before bulb 88 lights.

It will be appreciated that the relaxation of the tension of the brush spring on the tongue 26 and screw 42 against contact 48 will ultimately break the circuit at the screw 42 and contact 48, causing bulb 90 to go dark. Should this occur before sufficient pressure is applied tending to compress spring 80 and break the circuit at the contacts 60, 62, the bulb 92 will remain illuminated, thus indicating that the brush spring tension is too low.

If spring 80 compresses, closing circuit through contacts 68, 70 to bulb 88, before contacts 42, 48 separate, it is indicated to the worker that the brush tension is too high.

In Figures 3 and 4 there is illustrated a scale attachment for the device, that increases the accuracy of adjustments made in the testing apparatus, preliminary to use thereof. In this attachment, which has been designated generally by the reference numeral 96, there is included an upstanding stud 98 made rigid with the base 10, said stud being of hexagonal or other noncircular cross sectional shape, and being receivable in the complementary, downwardly facing socket of an adapter member 100, said adapter member 100 being connected to the lower end of a post 102. Post 102 is integral at its upper end with a C-shaped portion 104, the portion 104 having a conventional scale 106 connected to the upper end thereof. Scale 106 is graduated in ounces, and has a connection 108 to the adjacent end of the main lever 20.

In Figure 8 there is illustrated an adapter that is used when it is desired to test brush assemblies while said assemblies are out of their associated housing H. The adapter shown in Figure 8 includes a sleeve 110 adapted to be positioned over that portion of support 14 disposed between collar 28 and the adjacent end of support 14. At its inner end sleeve 110 is made rigid with a circular, flat flange 112 having circumferentially spaced pairs of marginally located openings 114.

Brush holders can be attached to the flange 112, by fastening elements extending through the openings 114, and will be properly positioned for location over the segment or tongue 26. The sleeve 110 is, of course, rotated as necessary to dispose each brush holder in turn above said tongue.

In a commercial embodiment, it might be advisable that high tension bulb 88 be red in color and marked "high"; that the spring tension relaxation bulb 90 be amber or clear, and marked "Brush spring"; and that the low tension bulb 92 also be colored red, and marked "low."

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in constructiton that may be permitted within the scope of the appended claims.

What is claimed is:

1. A device for testing the tension of commutator brush springs comprising: an approximately horizontally disposed, stationary support; a lever fulcrumed intermediate its ends upon said support and disposed for engagement at one end by a brush spring for rocking the lever in one direction under pressure exerted thereagainst by said spring; an auxiliary lever fulcrumed intermediate its ends upon the other end of said first-named lever, said auxiliary lever being spring biased in one direction about its fulcrum and being rockable about its fulcrum in an opposite direction under pressure exerted thereagainst by a user; and means on the respective levers for providing a signal to a user as to the relative positions of said levers, thereby to signify to the user the tension of said brush spring.

2. A device for testing the tension of commutator brush springs comprising: an elongated, horizontally disposed support; a lever fulcrumed intermediate its ends upon said support; a split sleeve secured to said support and embracing one end of said lever, said sleeve providing means for supporting the brush assembly of a motor housing carried by said support, whereby to dispose said brush assembly in engagement with said one end of the lever on rotation of the housing relative to the support; a first signal device, a first pair of contact elements on said lever and said support, a first lead connecting said signal device to said pair of contact elements, said pair of contact elements being movable into contacting relation responsive to rocking of the lever in one direction under pressure of the spring of said brush assembly; an auxiliary lever fulcrumed intermediate its ends upon the other end of said lever, said auxiliary lever being spring biased in one direction apart its fulcrum and being rockable about its fulcrum in an opposite direction under pressure exerted thereagainst by a user, thus to rock the first named lever in a direction opposing the brush spring; a second signal device, a second pair of contact elements carried by said auxiliary lever and said first named lever, a second lead connecting said signal device to said second pair of contact elements, said second pair of contact elements being movable into contacting relation responsive to pressure exerted against said auxiliary lever by a user, thereby to provide a signal to a user as to the tension inherent in said brush spring.

3. A device for testing the tension of commutator brush springs comprising: a horizontally disposed support; a main lever fulcrumed intermediate its ends upon said support; a sleeve secured to said support and embracing one end of the main lever, said sleeve being adapted to provide a support for a brush assembly, thereby to permit said brush assembly to be rotated about the support to a position in which said assembly is in engagement with said one end of the main lever; a support ring carried by said support and adapted for engaging a motor housing on which said brush assembly is mounted, said ring permitting rotation of said housing relative to the support and sleeve, thereby to facilitate proper disposition of the brush assembly relative to the main lever; a first signal device, a first pair of contact elements on said lever and said support, a first lead connecting said signal device to said pair of contact elements, said pair of contact elements being movable into contacting relation responsive to rocking of the lever in one direction under pressure of the spring of said brush assembly; an auxiliary lever fulcrumed intermediate its ends upon the other end of said lever, said auxiliary lever being spring biased in one direction about its fulcrum and being rockable about its fulcrum in an opposite direction under pressure exerted thereagainst by a user, thus to rock the first named lever in a direction opposing the brush spring; a second signal device, a second pair of contact elements carried by said auxiliary lever and said first named lever, and a second lead connecting said second signal device to said second pair of contact elements, said second pair of contact elements being movable into contacting relation responsive to pressure exerted against said auxiliary lever by a user, thereby to provide a signal to a user as to the tension inherent in said brush spring.

References Cited in the file of this patent

UNITED STATES PATENTS

| | | |
|---|---|---|
| 2,170,197 | Gumprich | Aug. 22, 1939 |
| 2,292,235 | McCarthy | Aug. 4, 1942 |
| 2,407,591 | Walley Jr. et al. | Sept. 10, 1946 |
| 2,620,657 | Stovall, Jr. | Dec. 9, 1952 |